US00RE41769E

(19) United States
(12) Reissued Patent
Richards et al.

(10) Patent Number: US RE41,769 E
(45) Date of Reissued Patent: Sep. 28, 2010

(54) SINGLE MULTIPLE APERTURE ("SMART") LENS SYSTEM

(75) Inventors: Les H. Richards, Round Rock, TX (US); James E. Nicholson, Austin, TX (US)

(73) Assignee: BAE Systems Information and Electronic Systems Integration Inc., Nashua, NH (US)

(21) Appl. No.: 11/036,319

(22) Filed: Jan. 14, 2005

Related U.S. Patent Documents

Reissue of:
(64) Patent No.: 6,507,392
Issued: Jan. 14, 2003
Appl. No.: 09/836,560
Filed: Apr. 16, 2001

(51) Int. Cl.
*G01B 11/26* (2006.01)
*F41G 7/00* (2006.01)
*G01C 21/02* (2006.01)
*G01V 1/42* (2006.01)

(52) U.S. Cl. ..... 356/141.5; 244/3.16; 250/203.1; 250/206.2; 250/208.2; 250/227.11

(58) Field of Classification Search .... 356/141.1–141.5; 250/206.2, 203.1, 203.2, 203.6, 208.2, 227.11; 244/3.13, 3.16
See application file for complete search history.

(56) References Cited

U.S. PATENT DOCUMENTS

| | | | | |
|---|---|---|---|---|
| 4,106,726 A | | 8/1978 | Emmons et al. | 244/3.17 |
| 4,131,248 A | | 12/1978 | Berglund | 244/3.16 |
| 4,395,121 A | | 7/1983 | Nory et al. | 356/152 |
| 4,598,884 A | | 7/1986 | Speer | 244/3.16 |
| 4,634,230 A | | 1/1987 | Spezio | 350/358 |
| 4,675,532 A | | 6/1987 | Carson | 250/578 |
| 4,696,441 A | | 9/1987 | Jones et al. | 244/3.13 |
| 4,792,675 A | | 12/1988 | Laughlin | 250/277 |
| 4,825,063 A | | 4/1989 | Halldorsson et al. | 250/203 R |
| 4,835,381 A | | 5/1989 | Sorensen, III | 250/277 |
| 4,914,284 A | * | 4/1990 | Halldorsson et al. | 250/206.2 |
| 4,923,276 A | | 5/1990 | Wells | 250/206.2 |
| 4,952,042 A | | 8/1990 | Pinson | 350/567 |
| 4,965,453 A | | 10/1990 | Hoschette et al. | 250/349 |
| 5,014,621 A | | 5/1991 | Fox et al. | 102/213 |
| 5,047,776 A | | 9/1991 | Baller | 342/52 |
| 5,052,635 A | | 10/1991 | Paulet et al. | 244/3.11 |
| 5,056,914 A | | 10/1991 | Kollodge | 356/5 |
| 5,082,201 A | | 1/1992 | Le Bars et al. | 244/3.16 |
| 5,114,227 A | | 5/1992 | Cleveland, Jr. | 356/152 |
| 5,129,595 A | | 7/1992 | Thiede et al. | 244/3.16 |
| 5,181,263 A | | 1/1993 | Derfiny | 385/24 |
| 5,191,385 A | * | 3/1993 | Kasser | |
| 5,202,742 A | | 4/1993 | Frank et al. | 356/5 |
| 5,206,499 A | * | 4/1993 | Mantravadi et al. | 250/203.6 |

(Continued)

FOREIGN PATENT DOCUMENTS

JP 2002090920 A * 3/2002

*Primary Examiner*—Isam Alsomiri
(74) *Attorney, Agent, or Firm*—Locke Lord Bissell & Liddell LLP

(57) ABSTRACT

One version of the invention relates to a laser detection system that includes a ball lens and a plurality of fiber optic bundles placed adjacent the ball lens so that incoming light rays are focused onto the bundles by the ball lens. In one particular version of the invention, a ball lens is one that can provide an almost infinite number of "principal" axes for off-axis light. Each fiber optic bundle is aimed in a different direction from each other bundle so that each bundle will have a different FOV even though the same ball lens is used to focus the incoming light rays.

20 Claims, 2 Drawing Sheets

U.S. PATENT DOCUMENTS 5,275,354 A 1/1994 Minor et al. ..... 244/3.17
5,311,611 A 5/1994 Migliaccio ..... 385/120
5,319,968 A 6/1994 Billing-Ross et al. ..... 73/178 R
5,319,969 A 6/1994 Billing-Ross et al. ..... 73/178 R
5,323,987 A 6/1994 Pinson ..... 244/3.16
5,345,304 A 9/1994 Allen ..... 356/5
5,357,331 A 10/1994 Flockencier ..... 356/5
5,477,383 A 12/1995 Jain ..... 359/565
5,500,520 A 3/1996 Komine ..... 250/203.1
5,528,358 A 6/1996 Bjorkman et al. ..... 356/141.1
5,682,225 A 10/1997 DuBois et al. ..... 356/73
5,760,852 A * 6/1998 Wu et al. ..... 349/14
5,771,092 A 6/1998 Dubois et al. ..... 356/147
5,784,156 A 7/1998 Nicholson ..... 356/141.5
5,788,180 A 8/1998 Sallee et al. ..... 244/3.21
6,014,270 A 1/2000 Bergmann et al. ..... 359/710
6,163,372 A 12/2000 Sallee et al. ..... 356/5.1
6,349,160 B2 * 2/2002 Tsien et al. ..... 385/35

* cited by examiner

SINGLE MULTIPLE APERTURE ("SMART") LENS SYSTEM

Matter enclosed in heavy brackets [ ] appears in the original patent but forms no part of this reissue specification; matter printed in italics indicates the additions made by reissue.

FIELD OF THE INVENTION

This invention relates generally to optical systems and, more particularly, to optical devices for determining the position of a source of light incident on the device.

BACKGROUND OF THE INVENTION

Optical systems for determining the geographical position of a source of light are used in a variety of applications. For example, conventional laser-guided missiles make use of reflected light from a laser beam pointed toward a potential target. Once a target is selected, information from the laser beam is used to determine the position of the target relative to the missile.

Such laser-guided missile systems are known in the art. One exemplary system is described in U.S. Pat. 5,784,156, to Nicholson, incorporated herein by reference. The incoming reflected light is detected at apertures located at different points on the exterior of the missile, typically on the nose cone or wing edges. Each aperture is provided with a lens or lens system that focuses the incoming light onto a bundle of fiber optic cables running inside the missile. The fiber bundles then transmit the incoming light onto sensors that convert the incoming light into electrical signals. These electrical signals are then analyzed by computers on board the missile to determine the relative distance, azimuth, and elevation between the missile and the object from which the incoming laser light is reflected.

Each aperture and its corresponding fiber bundle, or bundles, possesses a field-of-view ("FOV"), i.e., an angle from which it can detect light. All of the individual FOV of the apertures together form the overall FOV of the missile. Since the FOV of a given aperture is limited by the optics involved, to increase the FOV of a missile, one must typically increase the number of apertures and lenses employed by the missile. This problem is illustrated in FIG. 1B.

FIG. 1B shows a conventional dual lens "telescope" aperture configuration. In this configuration, the aperture is fitted with a primary lens 100 that focuses the incoming light rays, shown by dotted lines 102, onto a secondary lens 104. The secondary lens 104 then focuses incoming light rays onto a bundle of fiber optic cables 106. The fiber bundle 106 then transmits the incoming light onto sensors in the missile that convert the incoming light into electrical signals, which are used to determine the location of the target as discussed earlier. The FOV of the dual lens aperture arrangement shown in FIG. 1B is limited by the optical properties of the primary and secondary lens used. The FOVs are limited by off-axis light rays, and a typical FOV is plus or minus 10 or 15 degrees in conventional missile systems.

Similarly, another optical laser-guided missile system currently in use employs a plurality of ball lenses at each aperture, with each ball lens associated with a single fiber bundle. This arrangement is shown in FIG. 1 in which a ball lens 108 is used to focus incoming light rays 110 onto a fiber bundle 112. While this system is in some ways more advantageous than the dual lens system shown in FIG. 1B, it, nevertheless, still is limited to the FOV defined by the optical properties of the ball lens 108 and the fiber bundle 112.

Increasing the FOV of the missile would still involve providing additional ball lens/fiber bundle arrangements in additional apertures located on the missile. For example, a conventional Hellfire IR seeking missile creates 32 FOVs by using 32 apertures mounted in two circumferential rings in the missile nose.

BRIEF SUMMARY OF THE INVENTION

In one embodiment, the laser detection system comprises a ball lens and a plurality of fiber optic bundles placed adjacent the ball lens so that incoming light rays are focused onto the bundles by the ball lens. In one version of the invention, a ball lens is one that can provide, an almost infinite number of "principal" axes for off-axis light. Each fiber optic bundle is aimed in a different direction from each other bundle so that each bundle will have a different FOV even though the same ball lens is used to focus the incoming light rays. Because the fields-of-view of all the bundles together form the overall FOV of the ball lens, the more bundles that are incorporated into the system, the larger the FOV of a given ball lens. In one advantageous embodiment, the bundles may be disposed so that their fields-of-view may overlap partially.

DETAILED DESCRIPTION OF EMBODIMENTS OF THE INVENTION

Figure 1A:
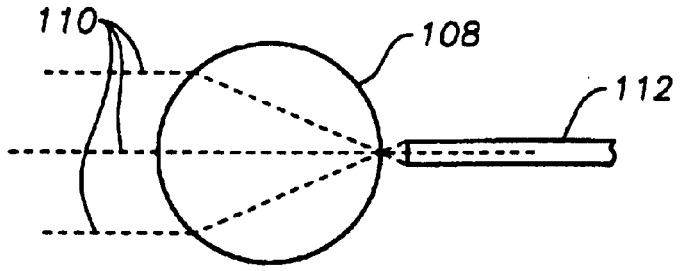
FIG. 1A is a schematic diagram showing a conventional single ball lens aperture configuration.
Figure 1B:
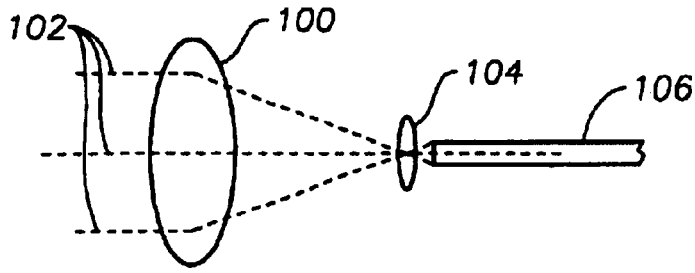
FIG. 1B is a schematic diagram showing a conventional dual lens aperture configuration.
Figure 2A:
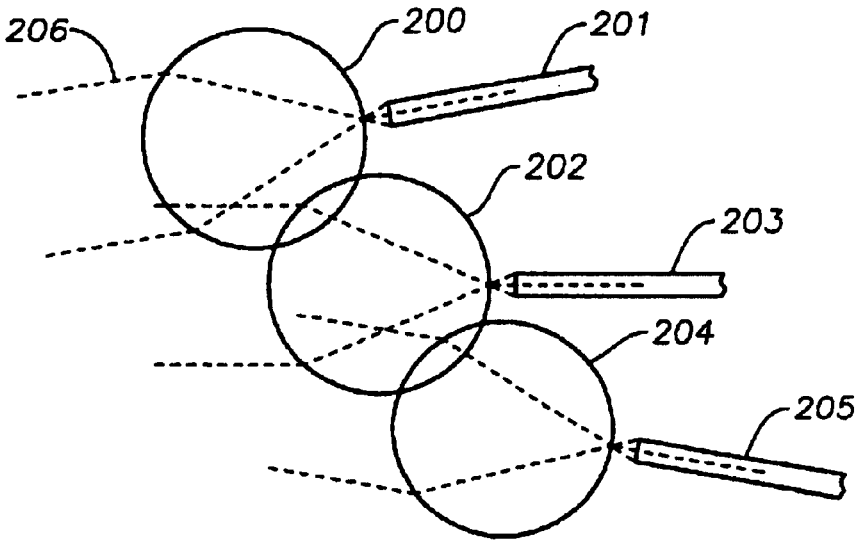
FIG. 2A is a schematic diagram showing an embodiment of the invention in which the FOV of an aperture is increased through the use of multiple ball lenses.

Referring now to FIG. 2A, there shown an embodiment to the invention using multiple ball lenses. In this case, three lenses, 200, 202, and 204, are arranged at a single aperture at a location on the missile not shown. Each lens is optically coupled to a single fiber bundle, 201, 203, and 205, respectively. Light rays 206 are focused by the ball lenses onto their respective fiber bundle. Fiber bundle 203, connected to ball lens 202, has an elevation of 0 degrees. In practice, this FOV angle would relate to the geometry of the missile or other device on which the fiber bundle 203 was placed. For example, on a guided missile, fiber bundle 203 could be aimed so that the axis of fiber bundle 203 was parallel to the longitudinal axis of the missile. The elevation of the FOV for fiber bundle 205 is increased relative to that of fiber bundle 203. Similarly, the elevation of fiber bundle 201 is decreased with respect to fiber bundle 203. The amount of increase or decrease in the FOV for fiber bundles 201 and 205 is a matter of design choice, and will only be limited by the optical properties of the lenses and fiber bundles used in the construction of the system. By using fiber bundles 201 and 205 in conjunction with fiber bundle 203, the FOV for the entire aperture shown in FIG. 2A is substantially increased in elevation. Of course, similar improvements could be made in azimuth as well.

Figure 2B:
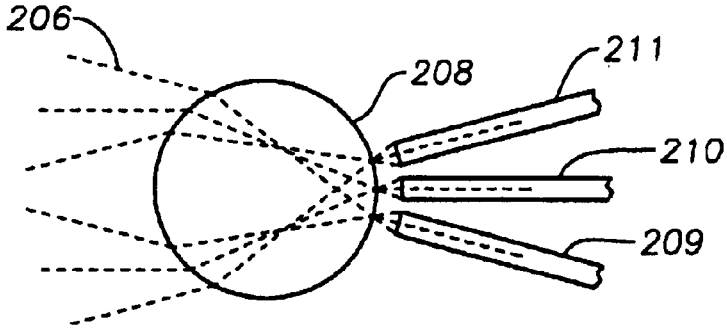
FIG. 2B is a schematic diagram of an embodiment to the invention which a single ball lens is provided with an increased FOV through the use of multiple fiber bundles.

According to a further embodiment to the invention, the advantages obtained by the optical system shown in FIG. 2A can be attained using a single ball lens shown in FIG. 2B. In this version of the invention, a single ball lens 208 is used to focus incoming light rays 206 onto a plurality of fiber bundles 209, 210, and 211. Each of these fiber bundles 209, 210, and 211 is positioned with respect to the ball lens 208 so that its FOV differs in elevation from its neighbors. Again, defining somewhat arbitrarily, fiber bundle 210 as having an elevation of zero degrees, then fiber bundle 209 has an elevation of its FOV greater than the elevation of fiber bundle 210 and 211 has an elevation of its FOV somewhat less than fiber bundle 210. In the particular embodiment shown in FIG. 2B, the FOV for each of the fiber bundle overlaps. This is particularly advantageous because the relative contributions of signals from the various fiber bundles allow one to determine angle of arrival information. This in turn produces guidance information for the missile.

Of course, it is not required that all the field-of-views overlap, and in other embodiments in the invention, the field of views can be non-overlapping, as a matter of design choice. In order to receive signals that can be used for guidance, at least adjacent fiber directions should produce an overlapping field-of-view. The fact that all FOVs do not overlap may be advantageous to systems that combine signals to a single detector. The non-overlapping FOVs in this case would produce less background noise due to a reduced field-of-view.

Figure 3A:
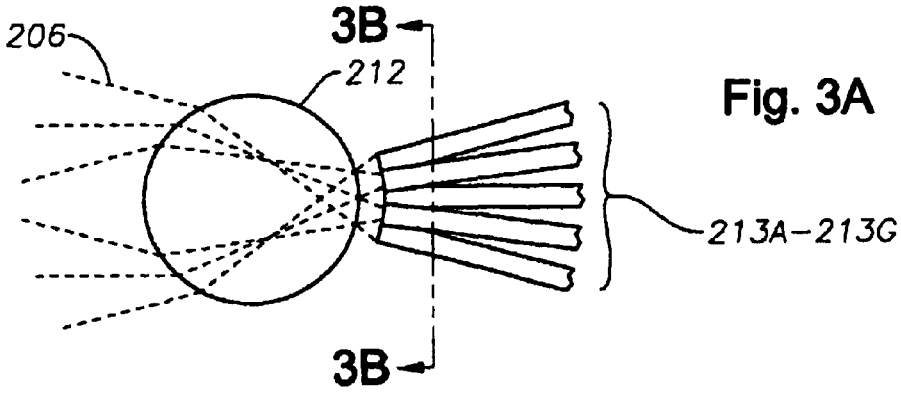
FIG. 3A is a schematic diagram of an embodiment to the invention showing a single ball lens provided with multiple overlapping FOVs.
Figure 3B:
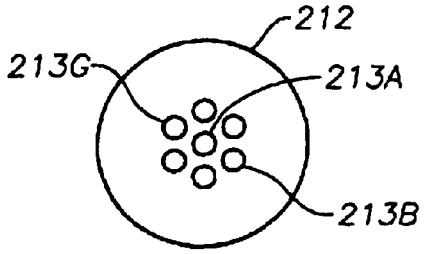
FIG. 3B is a schematic diagram showing the placement of a group of fiber bundles on a ball lens according to an embodiment of the invention.

Of course, the above embodiments have been described with respect to two dimensional drawings showing differences in the elevation of the field-of-views for the fiber bundles; however, those who are skilled in the art will recognize that it will be useful to arrange fiber bundles to increase the total FOV of the system in azimuth as well as elevational dimensions. FIG. 3 depicts a particularly advantageous arrangement of the fiber bundle placement with respect to the ball lens. Here, the ball lens 212 focuses the incoming light rays 206 onto a plurality of fiber bundles 213A–213G. The fiber bundles 213A–213G are arranged so that each has a unique FOV compared to the rest. The FOV of the total system is increased in a 360 degree pattern compared to the central fiber 213A located at zero degrees elevation and zero degrees azimuth. FIG. 3B is a cross-sectional view through section A—A of FIG. 3A looking in the direction of the arrows shown. It is seen that a central fiber 213A is surrounded by fibers 213B–213G. Each fiber 213B–213G is given a different angle of FOV in either azimuth or elevation, or both with respect to fiber 213A. This creates a larger FOV for the entire ball lens system shown in FIG. 3A, but while still maintaining an overlapping FOV for each individual fiber bundle.

In another embodiment of the invention, it is useful if the ball lenses are manufactured from different types of materials or glass. This allows one to modify the field-of-view of the lens and to affect the amount of coupling of light to the adjacent fiber bundles. One also has the flexibility to use different sizes of ball lenses. This also affects the overall FOV when used in conjunction with fiber bundles of different diameters and different numerical apertures ("NA").

Figure 4:
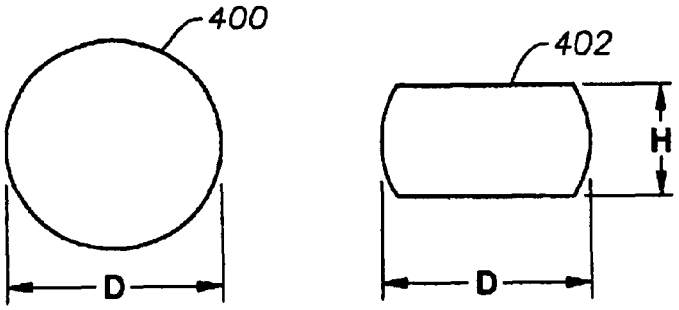
FIG. 4 is a cross-sectional view of a drum lens useful with an embodiment of the invention.

In still a further embodiment to the invention, it is possible to substitute a drum lens in place of the ball lens shown in FIGS. 2A–3B. Although technically not a "ball" lens, the drum lens shares some of the properties of a ball lens. FIG. 4 shows a comparison of a Ball Lens 400 and a Drum Lens 402. The length of both lenses is D as shown in FIG. 4. The height of the Drum Lens is H. As long as incident rays stay within the drum lens volume, the two lenses are functionally identical.

In still a further embodiment to the invention, it is useful that the effective FOV of the lens/fiber system be varied as follows. All fiber bundles point toward the center of the ball lens. The field-of-view is changed by varying the angle of each fiber bundle relative to the central or principal axis. The amount of overlapping signal depends upon the size of the fiber bundle at a particular angle. By pushing the fiber bundles closer to the ball lens, the amount of overlap between adjacent fiber bundles increases. The FOV can also be changed by varying the NA of each fiber. Therefore, the overall FOV can be controlled by changing the ball lens diameter or material composition, by changing the fiber numerical aperture, by changing the fiber bundle size, and/or by changing the fiber displacement from the ball lens. All of these factors are related to the required guidance precision.

There are many ways information from the reflected light energy may be used to determine the direction to the target. In one embodiment of the invention, each fiber bundle is coupled to a detector that converts the reflected light into electrical signals. The amplitudes of these electrical signals are related to the amount of light energy received from its corresponding fiber bundle. Because each fiber bundle has a unique FOV, those of skill in the art will recognize that the amount of energy received at the various FOVs can be interpolated to calculate the direction to the target.

Figure 5:
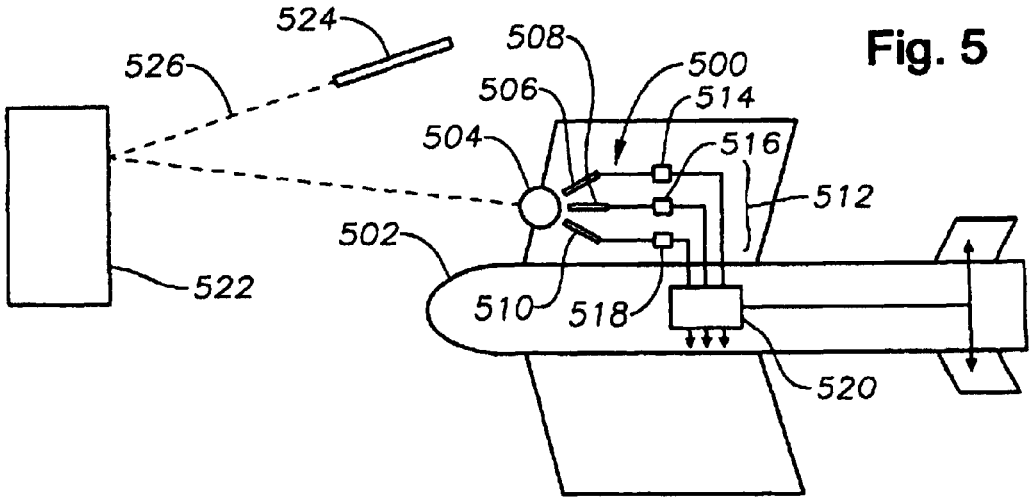
FIG. 5 is a schematic diagram of a laser detection system coupled to a guided vehicle as disclosed herein.

FIG. 5 is a schematic diagram of a laser detection system 500 coupled to a guided vehicle 502 as disclosed herein. The guided vehicle 502, for example, can be a missile. A ball lens 504 is coupled to the guided vehicle. The balls lens 504 has an interior that is formed from a solid, that is, is a single element ball lens. A plurality of fiber bundles 506, 508, 510 are disposed adjacent the ball lens 504. At least some of the fiber optic bundles are pointed toward a center of the ball lens 504 and have overlapping fields-of-view with other fiber optic bundles. A sensor system 512 can include a plurality of detectors 514, 516, 518 and associated hardware that converts light from the fiber bundles into electrical signals. A computer system 520 can use the electrical signals from the detectors to compare an amount of energy contained in the light from various fiber optic bundles to calculate the direction of the guided vehicle to a target 522. A laser 524 can be used to direct a beam of light 526 toward the target 522 that is reflected and to the ball lens 504. Naturally, the guided vehicle can have one or more of the ball lens and fiber optic bundle arrangements coupled to the computer system to provide other information as desired.

Although the present invention has been described with respect to its application in guided missile systems, those who are skilled in the art will recognize that the invention also pertains to increased field-of-views in optical systems employing fiber optic cables in connection with optical lenses. For example, the invention is easily adapted to any system that uses reflected laser energy for guidance. For example, any robotic system could use reflected laser light in conjunction with the ball lens for increased precision in navigating toward the target. This could include mobile robots, such as cars, androids, etc. that have a task to move from point A (their present location) to point B where the item of interest is located. Similarly, a robotic arm could be guided to a laser illuminated "part of interest" located on a moving platform, such as a conveyor belt. Still other applications within the scope and spirit of the present invention will occur to those of skill in the art in view of the foregoing disclosure.

What is claimed is:

1. A laser detection system comprising:

at least one ball lens formed of a solid single element;

a plurality of fiber optic bundles disposed adjacent the ball lens, at least some of the plurality of fiber optic bundles being pointed toward a center of the ball lens and adapted to have overlapping fields-of-view with other fiber optic bundles;

a laser adapted to direct a beam of light toward a target, such that the ball lens is arranged on a vehicle to receive reflected light from the target; and a computer system that processes information related to the reflected light to guide the movement of the vehicle relative to the target.

2. The laser detection system of claim 1 wherein the computer system guides the movement of the vehicle relative to the target based on an interpolation between differences in the reflected light from different fiber optic bundles.

3. The laser detection system of claim 2 further comprising a plurality of detectors for convert*ing* reflected light into electrical signals, wherein the computer system uses the electrical signals to compare an amount of energy contained in the light from the plurality of fiber optic bundles and uses this comparison to calculate the direction of the vehicle to the target.

4. The laser detection system of claim 1 further comprising a sensor system having a plurality of detectors coupled to the fiber optic bundles.

5. The laser detection system of claim 1 wherein the plurality of fiber optic bundles comprise multiple fiber optic bundles.

6. The laser detection system of claim 5 wherein multiple fiber optic bundles are disposed to form an array around a bundle in the center of the array.

7. An apparatus for use in guided vehicle applications, the apparatus comprising:

a laser for directing a beam of light toward a target;

a ball lens formed of a solid single element and arranged on the vehicle to receive reflected light from the target;

a plurality of fiber optic bundles coupled to the ball lens, at least some of the plurality of the fiber optic bundles being pointed toward a center of the ball lens and adapted to have overlapping fields-of-view with other fiber optic bundles, wherein the fiber optic bundles pass the reflected light; and a computer system that receives information related to the reflected light passed from the fiber optic bundles and processes the information to guide the movement of the vehicle relative to the target.

8. An apparatus as in claim 7 further comprising a plurality of detectors for converting light into electrical signals.

9. An apparatus as in claim 8 wherein the electrical signals generated by each detector [is] *are* responsive to the amount of energy contained in the light received from its corresponding fiber optic bundle.

10. An apparatus as in claim 9 wherein the computer system uses the electrical signals to compare [amount] *the amounts* of energy contained in the light from the plurality of fiber optic bundles and uses this comparison to calculate the direction to the target.

*11. A laser detection system, comprising:*

*at least one drum lens formed of a solid single element;*

*a plurality of fiber optic bundles disposed adjacent the drum lens, at least some of the plurality of fiber optic bundles being pointed toward a center of the drum lens and adapted to have overlapping fields-of-view with other fiber optic bundles;*

*a laser adapted to direct a beam of light toward a target, such that the drum lens is arranged on a vehicle to receive reflected light from the target; and*

*a computer system that processes information related to the reflected light to guide the movement of the vehicle relative to the target.*

*12. The laser detection system of claim 11 wherein the computer system guides the movement of the vehicle relative to the target based on an interpolation between differences in the reflected light from different fiber optic bundles.*

*13. The laser detection system of claim 12 further comprising a plurality of detectors for converting reflected light into electrical signals, wherein the computer system uses the electrical signals to compare an amount of energy contained in the light from the plurality of fiber optic bundles and uses this comparison to calculate the direction of the vehicle to the target.*

*14. The laser detection system of claim 11 further comprising a sensor system having a plurality of detectors coupled to the fiber optic bundles.*

*15. The laser detection system of claim 11 wherein the plurality of fiber optic bundles comprise multiple fiber optic bundles.*

*16. The laser detection system of claim 15 wherein multiple fiber optic bundles are disposed to form an array around a bundle in the center of the array.*

*17. An apparatus for use in guided vehicle applications, the apparatus comprising:*

*a laser for directing a beam of light toward a target;*

*a drum lens formed of a solid single element and arranged on the vehicle to receive reflected light from the target;*

*a plurality of fiber optic bundles coupled to the drum lens, at least some of the plurality of the fiber optic bundles being pointed toward a center of the drum lens and adapted to have overlapping fields-of-view with other fiber optic bundles, wherein the fiber optic bundles pass the reflected light; and*

*a computer system that receives information related to the reflected light passed from the fiber optic bundles and processes the information to guide the movement of the vehicle relative to the target.*

*18. An apparatus as in claim 17 further comprising a plurality of detectors for converting light into electrical signals.*

*19. An apparatus as in claim 18 wherein the electrical signals generated by each detector are responsive to the amount of energy contained in the light received from its corresponding fiber optic bundle.*

*20. An apparatus as in claim 19 wherein the computer system uses the electrical signals to compare the amounts of energy contained in the light from the plurality of fiber optic bundles and uses this comparison to calculate the direction to the target.*

* * * * *